United States Patent [19]

Utsch

[11] Patent Number: 4,730,404
[45] Date of Patent: Mar. 15, 1988

[54] MOTOR VEHICLE LICENSE PLATE HOLDER OF SYNTHETIC RESIN

[76] Inventor: Manfred Utsch, Haspelweg 9, D-5900 Siegen, Fed. Rep. of Germany

[21] Appl. No.: 848,123

[22] Filed: Apr. 3, 1986

[30] Foreign Application Priority Data

Apr. 6, 1985 [DE] Fed. Rep. of Germany ... 8510272[U]

[51] Int. Cl.$^4$ ................................................ G09F 7/00
[52] U.S. Cl. ...................................... 40/209; 40/611; 40/154; 40/156
[58] Field of Search ................. 40/154, 156, 611, 202, 40/209

[56] References Cited

U.S. PATENT DOCUMENTS

| | | | |
|---|---|---|---|
| 1,630,658 | 5/1927 | Davis | 40/209 |
| 1,821,053 | 9/1931 | Dietz | 40/209 |
| 1,864,641 | 6/1932 | Davis | 40/209 |
| 2,624,966 | 1/1953 | Baumgartner | 40/209 |
| 2,853,818 | 9/1958 | Simon | 40/209 |
| 2,910,793 | 11/1959 | Helmer | 40/209 |
| 3,755,945 | 9/1973 | McEwen | 40/209 |
| 4,038,770 | 8/1977 | Bott | 40/209 |

FOREIGN PATENT DOCUMENTS 2677177  6/1977  Fed. Rep. of Germany .

Primary Examiner—Henry E. Raduazo
Attorney, Agent, or Firm—Young & Thompson

[57] ABSTRACT

The reinforcing construction member of synthetic resin for motor vehicle license plates comprises a marginal bead surrounding the stamped rim of the license plate and a surface in contact with the reverse side of the license plate. It is fashioned as a frame (1) with an angular profile (5, 6) covering the stamped rim of the license plate all-around from the front and from the side. The surface of the reinforcing construction member in contact with the rear side of the license plate consists of several partial surfaces formed, on the one hand, by connecting webs (9) shaped integrally with the angular profile (5, 6) of the frame and bridging respectively two mutually parallel-extending lateral parts thereof and, on the other hand, by holding lugs (10, 11) shaped at the two other lateral parts (4) of the frame, one of these holding lugs (10) being shorter than the other.

3 Claims, 3 Drawing Figures

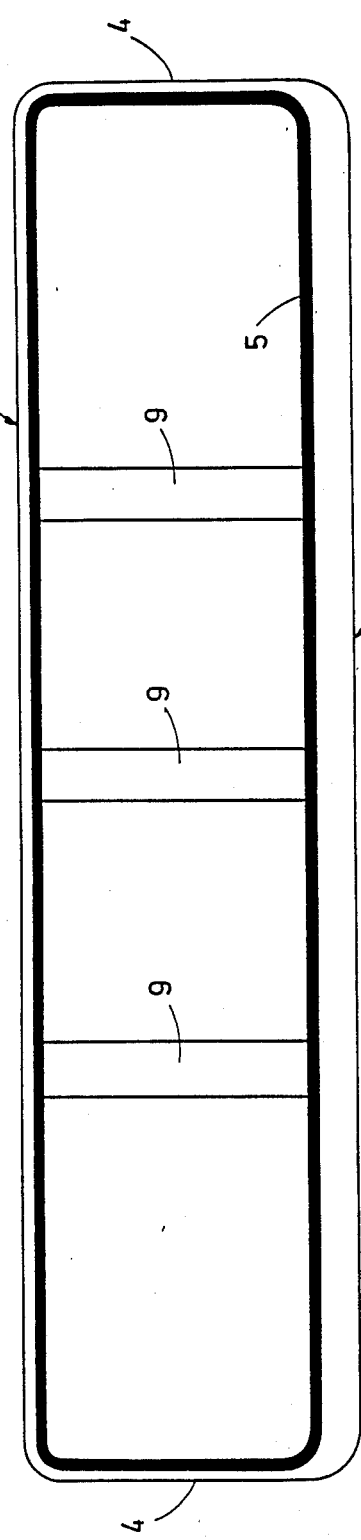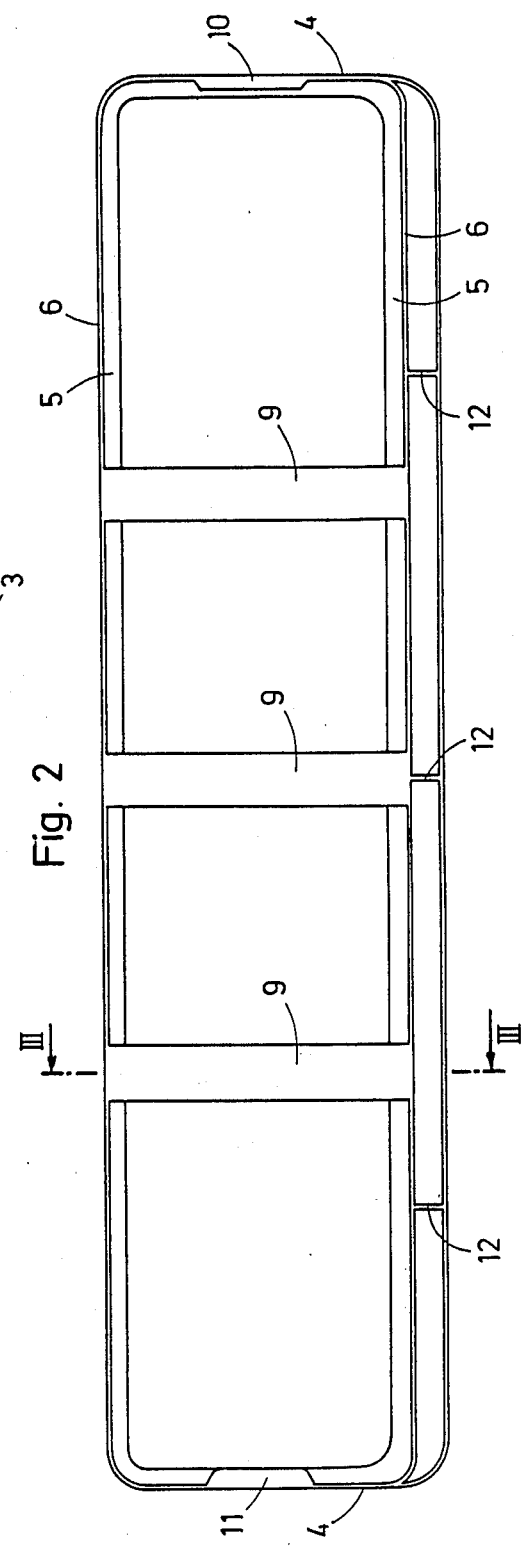

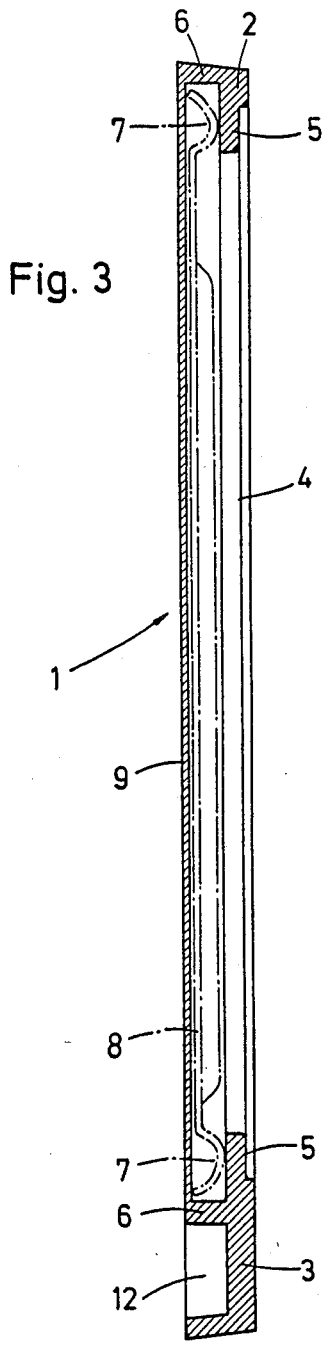

MOTOR VEHICLE LICENSE PLATE HOLDER OF SYNTHETIC RESIN

The invention relates to reinforcing construction members of synthetic resin for motor vehicle license plates with a marginal bead surrounding the stamped rim of the license plate and with a surface in contact with the reverse side of the license plate.

Conventional reinforcing construction members of this type made of a synthetic resin constitute a solid panel placed in back of a motor vehicle license plate. Consequently, a relatively large amount of synthetic resin is needed for manufacturing these conventional reinforcing panels. The license plate is supported, by means of the known reinforcing panels, merely in the rearward direction and, respectively, with respect to the car body.

The invention is based on the object of providing a reinforcing construction member for motor vehicle license plates which can be produced economically of a small amount of synthetic resin and offers improved protection for the license plate.

According to the present invention by providing that the motor vehicle license plate can be inserted from the side in a frame-style reinforcing construction member and is retained thereby all-around as if it were located in a pocket, attaining with a small amount of material a genuine all-around reinforcement of the license plate.

The drawings illustrate one embodiment of the invention in which:

FIG. 1 shows the front side of the reinforcing construction member without the license plate, FIG. 2 shows the rear side of the reinforcing construction member, and FIG. 3 shows an enlarged sectional view along line III—III in FIG. 2 with the license plate shown in phantom line.

The illustrated reinforcing construction member is fashioned as a rectangular frame 1 with two long lateral portions 2, 3 and two short lateral portions 4, and consists of a hard but resilient synthetic resin. The lateral parts 2, 3, 4 constitute an angular profile extending all-around, covering with one leg 5 a stamped rim 7 of a motor vehicle license plate 8 (FIG. 3) at the front and, with the other leg 6. The leg 5 of the angular profile is offset rearwardly by a small extent on the front side.

On the rear side of the frame 1, the long lateral portions 2, 3 thereof are bridged by thin connecting webs 9, of which preferably three are provided; these webs extend in a plane common to all of them on the rear side of the license plate 8. Holding lugs 10, 11 are integrally molded to the short lateral parts 4 of the frame 1 in the same plane as webs 9, these holding lugs likewise extending behind the license plate 8. One holding lug 10 (see FIG. 2) projects to a somewhat lesser extent than the opposed holding lug 11. Thereby, the license plate 8 can be inserted in the frame 1, before being mounted on the motor vehicle, from the side of the shorter holding lug 10. On account of the slight elasticity of the frame 1, the holding lug 10 can be locked in place behind the license plate 8 after insertion of the license plate 8 by a slight outward bending of the associated lateral part 4, so that the license plate is retained between the legs 5, 6 of the angular profile, the connecting webs 9, and the holding lugs 10, 11.

As can be seen from the drawing, one of the long lateral parts (in this case the lateral part 3) is made to be broader so that lettering (for example the company name of the car dealer) can be applied to the front side. The broad lateral part 3 can be arranged at the top or at the bottom, depending on the manner of mounting on the vehicle, and is fashioned on the rear side to be hollow and with reinforcing ribs 12.

What is claimed is:

1. A motor vehicle license plate of resilient synthetic resin for automotive vehicles, comprising a closed rectangular frame having two opposite relatively long legs and two opposite relatively short legs, the rear edges of said legs lying in a single plane, said license plate being of one-piece molded construction and having a plurality of spaced webs parallel to and spaced from said vertical legs and from each other and interconnecting said long legs and a pair of tongues extending toward each other from both of said short legs, the rear surfaces of said tongues and webs lying in said plane, one of said tongues being shorter than the other.

2. A license plate holder as claimed in claim 1, at least one of said long legs being recessed along its forward inner edge.

3. A license plate holder as claimed in claim 1, one of said long legs being broader than the other, said broader leg having a rearwardly opening hollow extending lengthwise thereof, and reinforcing ribs bridging said hollow.

* * * * *